United States Patent Office 3,397,816
Patented Aug. 20, 1968

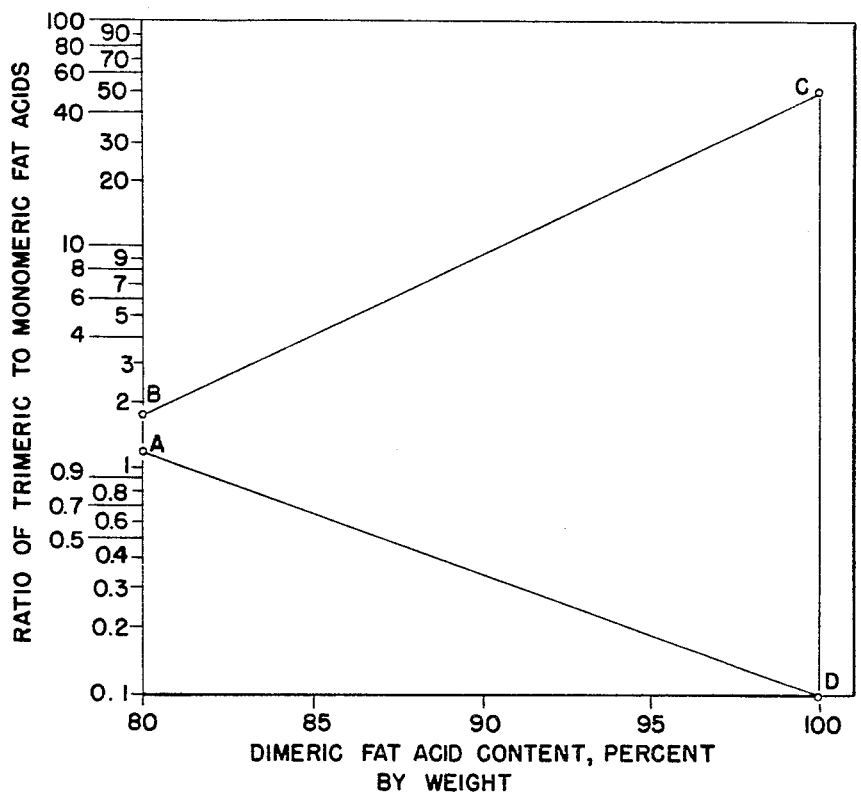

3,397,816
CAN HAVING SEAMS ADHESIVELY BONDED BY THE REACTION PRODUCT OF ALKYLENE DIAMINE, ALKANOL AMINE, DICARBOXYLIC ACID, AND POLYMERIC FAT ACID
Richard J. Ess, Minneapolis, and Don E. Floyd, Robinsdale, Minn., assignors to General Mills, Inc., a corporation of Delaware
Filed July 18, 1963, Ser. No. 296,048
12 Claims. (Cl. 220—81)

This invention relates to high molecular weight resinous compositions having certain unique properties which make them particularly suitable for adhesives for metal such as in bonding seams of metallic containers. More particularly, it relates to copolymer polyesteramide-polyamide compositions prepared from a mixture of (A) an aliphatic diamine and (B) an alkanol amine with a mixture of (C) fractionated polymeric fat acids and (D) other polybasic acids.

The products of this invention provide unexpectedly high peel strength combined with good impact strength which make the products particularly desirable for bonding of the seams of metallic containers.

It is therefore an object of this invention to provide a copolymer polyesteramide-polyamide composition having improved properties.

It is also an object of this invention to provide such a product for use in bonding the seams of metallic containers and to provide improved metallic containers.

It is further an object of this invention to provide such compositions from the reaction of a mixture of (A) an aliphatic diamine and (B) an alkanol amine with a mixture of (C) fractionated polymeric fat acids and (D) other polybasic acids.

The copolymer resins of the present invention are derived from a mixture of polymeric fat acids and other polybasic acids such as sebacic or adipic. The polymeric fat acids employed, however, contain more than 80% of the dimeric species together with carefully controlled amounts of the trimeric and monomeric species.

We have found that to realize the peel strength and high degree of flexibility required in the polyesteramide-polyamides of our invention, it is necessary that the polymeric fat acids employed as starting materials in the preparation of the copolymers of our invention be fractionated to obtain dimer acid cuts of greater than 80% dimeric fat acid by weight. In addition, we have found that it is necessary to control the amounts and particularly the ratios of trimeric and monomeric fat acids. Generally, when the dimeric fat acid content is only slightly above 80% by weight, the trimer to monomer ratio must be carefully controlled within relatively narrow limits. It has been our experience that for dimeric fat acids content of about 80% when the trimer to monomer ratio rises substantially above about 1.8:1, products result with a melt viscosity too high to be practicable (or even infusible "gelled" products may result). On the other hand, at the same dimeric fat acid content when the trimer to monomer ratio falls below about 1.2:1, the resulting products lack the requisite flexibility, are brittle, and are generally unsatisfactory products. We have found that as the dimeric fat acid content increases to levels significantly higher than 80% by weight, for example, at 95% dimeric fat acid content, the necessity to control the trimer to monomer ratio is lessened quite markedly. At 95% by weight dimeric fat acids content, the polyesteramide-polyamides of the present invention prepared therefrom are highly satisfactory copolymers over an extremely broad range of trimer to monomer ratios. Satisfactory products have been prepared wherein the trimer:monomer ratio has been as low as about 0.30:1 and as high as about 15:1. Above 95% the criticality of the trimer:monomer ratio is almost non-existent. Generally satisfactory copolymers can be prepared at virtually any trimer:monomer ratio.

Defining the exact trimer:monomer ratio for each level of dimeric fat acids content by an appropriate mathematical relationship is impractical. For our purposes, we have found that a graphical representation most accurately depicts the bounds of the present invention. The accompanying drawing is a plot of the areas within which satisfactory products may be made using the concept of our invention. The ordinate is a log scale of trimer:monomer ratio. The abscissa is a linear scale of dimeric fat acids content in percent by weight. The area bounded substantially within the curve ABCD includes those polyamides, defined in the present invention, which are considered satisfactory adhesives. The area essentially outside the area ABCD contains those polyamides which are not satisfactory adhesives. Those products falling generally below the boundary AD fail as being brittle non-flexible. Those falling generally above the boundary BC fail as having a melt viscosity of a level impractically high or as being intractable gelled polymers. From a practical standpoint, the point C can be fixed at about 50 (trimer:monomer ratio) as representing dimeric fat acids of very high purity and very high trimer:monomer ratios. Theoretically, of course, as the monomeric fat acids content approaches zero for polymeric fat acids approaching 100% purity, the point C approaches infinity as its ordinate.

The term "polymeric fat acids" as used herein is intended to be generic to polymerized acids obtained from "fat acids." The term "fat acids" is intended to include saturated, ethylenically unsaturated and acetylenically unsaturated naturally occurring and synthetic monobasic aliphatic acids containing from 8 to 24 carbon atoms.

The saturated, ethylenically unsaturated and acetylenically unsaturted fat acids are generally polymerized by somewhat different techniques, but because of the functional similarity of the polymerization products, they all are essentially referred to as "polymeric fat acids."

Saturated fat acids are difficult to polymerize but polymerization can be obtained at elevated temperatures with a peroxidic catalyst such as di-t-butyl peroxide. Because of the generally low yields of polymeric products, these materials are not currently commercially significant. Suitable saturated fat acids include branched and straight acids such as caprylic acid, pelargonic acid, capric acid, lauric acid, myristic acid, palmitic acid, isopalmitic acid, stearic acid, arachidic acid, behanic acid and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched straight chain, poly- and mono-ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid, and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono-unsaturated and poly-unsaturated, are useful monomers for the preparation of the polymeric fat acids. Suitable examples of such materials include 10-undecynoic acid, tariric acid, stearolic acid, benhenolic acid and isamic acid.

Because of their ready availability and relative ease of polymerization, oleic and linoleic acid are the preferred starting materials for the preparation of the polymeric fat acids.

It is understood that the term "polymeric fat acids" includes the acids and such other derivatives capable of forming amides in a reaction with a diamine such as the lower alcohol esters of polymeric fat acids.

Having obtained the polymeric fat acids or derivatives as described above, they may then be fractionated, for example, by conventional techniques of distillation or solvent extraction. They may be hydrogenated (before or after distillation) to reduce unsaturation under hydrogen pressure in the presence of a hydrogenation catalyst.

Typical compositions of commercially available polymeric fat acids, based on unsaturated $C_{18}$ fat acids, are:

| | Percent by weight |
|---|---|
| $C_{18}$ monobasic acids ("monomer") | 5–15 |
| $C_{36}$ dibasic acids ("dimer") | 60–80 |
| $C_{54}$ (and higher) ("trimer") polybasic acid | 10–35 |

The relative ratios of monomer, dimer and trimer (or higher) in unfractionated polymeric fat acids are dependent on the nature of the starting material and the conditions of polymerization. For the purposes of this invention, the term monomeric fat acids refers to the unpolymerized monomeric acids or derivatives present in the polymeric fat acids; the term dimeric fat acids refers to the dimeric acids or derivatives (formed by the dimerization of two fat acid molecules); and the term trimeric fat acids refers to the residual higher polymeric forms consisting primarily of trimeric acids or derivatives, but containing some higher polymeric forms.

For the purposes of this invention, the terms monomeric, dimeric, and trimeric fat acids, are defined further by a micromolecular distillation analytical method. The method is that of Paschke, R. F., et. al., J. Am. Oil Chem. Soc. XXXI (No. 1), 5 (1954), wherein the distillation is carried out under high vacuum (below 5 microns) and the monomeric fraction is calculated from the weight of product distilling at 155° C., the dimeric fraction is calculated from that distilling between 155° C. and 250° C., and the trimeric (or higher) fraction is calculated based on the residue.

Mixtures may be fractionated by suitable means such as high vacuum distillation or solvent extraction techniques so as to obtain dimer acid cuts of greater than 80% by weight. It is these dimer-rich fractions which are the starting materials for the copolyamides of the present invention.

While the polymeric fat acids employed in the present invention are relatively high in dimer content, they do contain substantial amounts of monomer and trimer. Polyesteramide-polyamides from adipic or sebacic acid, and polymeric fat acid, and 1,2-diaminoethane can be made with the desirable properties described herein (high tensile strength and high elongation) employing polymeric fat acids wherein the trimeric and/or monomeric fat acids content is carefully controlled within the limits specified in the accompanying graphic plot. That the trimeric and/or monomeric fat acids content is critical is shown by the fact that the copolyamides of the present invention exhibit gelation at ratios of trimeric fat acids to monomeric fat acids substantially above those represented by the line BC, and exhibit low elongation at ratios substantially below those represented by the line AD. Gelation may be defined as the range in which the copolymer becomes intractable or the melt viscosity of the copolymer is so high as to be impractical when measured at a temperature below which polymer decomposition is so rapid as to negate the use of the polymer. Melt viscosities as high as 500 poises at 275° C. have been taken. However, at this temperature, the decomposition of the product is quite rapid and generally impractical. A practical upper limit for defining gelation would be a melt viscosity of the order to 500 poises at 275° C.

The dibasic acids used in conjunction with the dimer acids to prepare the polyesteramide-polyamides of the present invention have the general formula:

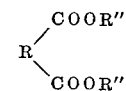

where R is a hydrocarbon radical of from 2 to 20 carbon atoms and R″ is hydrogen or a low aliphatic hydrocarbon radical having from 1 to 8 carbon atoms such as the alkyl groups, methyl, ethyl, propyl, butyl, hexyl and octyl. The preferred range of these dibasic acids is where R is from 2 to 8 carbon atoms, such as adipic, succinic, glutaric, pimelic, suberic, azelaic, sebacic, terephthalic and the like with the acids wherein R is a divalent alkylene radical being the more preferred. From an economic standpoint, adipic and sebacic acids, or mixtures thereof are preferred.

The diamines with which the above acids are reacted to give the polyesteramide-polyamides of the present invention have the general formula:

where R' is an aliphatic radical of from 2 to 20 carbon atoms. In general R' is a divalent alkylene radical having from 2 to 12 carbon atoms. Illustrative of the diamines which may be employed are 1,2-diaminoethane, 1,3-diaminopropane, 1,4-diaminobutane, 1,6-diaminohexane, 1,10-diaminodecane, 1,12-diaminododecane, and 1,18-diaminooctadecane. In addition R' may be branched as in 3,4-diethyl-1,6-diaminohexane, 3-ethyl-1,8-diaminooctane, 2-nonyl-1,10-diaminodecane, and 2-octyl-1,4-diaminoundecane.

The alkanol amines which may be employed in this invention are the monoalkanolamines having the general formula:

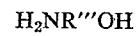

$$H_2NR'''OH$$

where R‴ is a divalent aliphatic hydrocarbon radical having from 2 to 8 carbon atoms, and preferably an alkylene radical having from 2 to 8 carbon atoms such as monoethanolamine, propanolamine, butanolamine, 2-amino-3-hexanol, 2-amino-4-pentanol, 5-amino-4-octanol, 3-amino-3-methyl-2-butanol and the like. R‴ may be straight or branched chains.

Considerable variation is possible in the relative proportion of reactants employed depending upon the particular set of properties desired in the resin. The molar equivalent ratio or polymeric fat acids to dicarboxylic acids (adipic, sebacic, etc., and mixtures thereof) can be varied from about 1:0.05 to about 1:0.5. Accordingly, the amount of diamine and/or alkanol amine must be varied based on the relative amount of carboxylic acid present. Essentially, the molar equivalents of carboxylic acid is equal to the sum of the amine and hydroxyl equivalents. The molar equivalent ratio of alkylene diamine to alkanol amine can be varied from about 20/1 to 1/2, preferably in the range from about 10/1 to 1/1. The time and temperature of reaction may be varied over a considerable range but is usually from 150–300° C. and for a period of from ½–8 hours, the longer time period being used at the lower temperatures.

High strength, flexible copolyamides prepared without employing an alkanolamine are excellent thermoplastic adhesives for a number of uses. However, they are surprisingly ineffective as materials to bond the seams of metallic containers, as seen hereinbelow. We have discovered that the substitution of part of the conventional diamine of a copolyamide formulation with an alkanolamine (such as ethanolamine) results in a polyesteramide-polyamide of remarkably improved peel strength. These products are highly useful as bonding materials in the seams of metallic containers. The exact mechanism of this improvement is not known. However, it is felt that the presence of the ester linkages, while decreasing the tensile strength somewhat (very high tensile strength is not a prerequisite for a satisfactory bond), greatly increases the wetting of the metal surfaces by the copolymer adhesive. This markedly improved adhesion together with the elongation derived from the high purity dimeric fat acids "backbone" combine to give the requisite peel strength.

The following examples will serve to illustrate further the spirit and scope of the present invention. These examples are not to be construed as limiting, but merely serve as illustrations of compositions falling within the scope of our invention. Percentages and parts are by weight unless specifically noted otherwise.

*Example 1*

The mechanical properties of direct interest in the compositions of the present invention are tensile strength and elongation. These properties are measured on an Instron Tensile Tester Model TTC using ASTM 1248–58T.

The polymer is molded as a 6″ x 6″ sheet of approximately 0.05 inch thickness, at a temperature near its melting point (usually a few degrees lower than the melting point) and at 2000 lbs. pressure or higher using cellophane as the parting agent in the mold. From this sheet, test specimens are die-cut to conform to ASTM D–412. Gage marks are inscribed in about the center of the test specimen (ink or crayon) approximately 1″ apart.

The test specimen is clamped in the jaws of the Instron. Crosshead speed is usually 2 inches/minute at 100 pound full scale load. Chart speed is 2 inches/minute. Tensile strength (reference: ASTM D–639–52T) is calculated as:

$$\text{Tensile strength} = \frac{\text{load in pounds at rupture}}{\text{cross sectional area (sq. in.)}}$$

Percent elongation is calculated as:

Percent elongation =

$$\frac{\text{gage length at break minus gage length at 0 load}}{\text{gage length at 0 load}} \times 100$$

In addition to tensile strength and elongation, the following properties were measured on most of the polymers prepared:

(1) Ball and ring melting point: ASTM E28–58T.
(2) Melt viscosity: Brookfield viscometer (#5 spindle).
(3) Amine and acid numbers: Conventional analytical titration procedures.

(4) Peel strength: Force expressed in pounds per inch necessary to separate two strips of can maker's quality black plate one inch wide sealed for a length of about one inch and a layer thickness of 3 to 5 mils of the adhesive being tested. The two uncemented ends are then drawn over a plurality of ½ inch ball bearing rollers suspended in a jig which is hung or suspended in a Dillon Tester. The ends of the strips are then pulled over the rollers at a rate of one inch per minute.

(5) Impact resistance: Impact expressed in inch pounds on samples prepared by melting and pouring the adhesive in a can and unit, cooling to about 15° F., and then impacting on the metal side by dropping a weighed plumet (¼ lb.) from an increasing height.

A typical procedure for the preparation of the copolymers of this invention is summarized as follows:

A one-liter, 3-neck flask fitted with a thermometer, mechanical stirrer and simple distilling head is charged with the polymeric fat acids, other dibasic acid and an antioxidant (p-t-amylphenol-formaldehyde resin). The mixture is stirred and heated to about 60° C. and a mixture of the diamine and alkanol amine is carefully added. The temperature is gradually raised while by-product water is removed by distillation. Over a period of two hours the temperature is gradually raised to 205° C., then held at 205° C. for four hours; the first two hours at atmospheric pressure and the final two hours under water pump vacuum of approximately 10–20 mm. of mercury.

The procedure described above was followed in all the examples with the exception of Examples 1 and 2 when it was necessary to raise the temperature above 205° C. because of the high viscosity of the products. The top reaction temperature in Example 1 was 245° C. and in Example 2 it was 235° C. The results of the examples run can be seen in Table I hereinbelow, in which the polymeric fat acids employed had the composition as follows:

|  | Percent Monomer (M) | Percent Dimer (D) | Percent Trimer (T) |
|---|---|---|---|
| Examples 1 through 5 | 2.75 | 95.2 | 2.05 |
| Examples 6 through 9 | 1.2 | 98.8 | 0 |

TABLE I

| Example Number | Equivalents[1] Ethylene Diamine | Equivalents[1] Ethanolamine | Adipic Acid, phr. of dimer | Ball and Ring Softening Point, °C. | Viscosity, poises at 200° C. | Peel Strength, pounds/inch | Percent Elongation | Tensile Strength, p.s.i. | Impact, Resistance, inch/pounds |
|---|---|---|---|---|---|---|---|---|---|
| 1 | 0.65 | 0.35 | 12 | 185 | [2] 95 | 98 | 415 | 1,300 | >3½, >3½ |
| 2 | 0.65 | 0.40 | 12 | 193 | [3] 100 | 65 | 460 | 1,200 | >3½, >3½ |
| 3 | 0.60 | 0.40 | 5 | 150 | 26 | 83 | 740 | 550 |  |
| 4 | 0.65 | 0.35 | 7 | 168 | 30 | 82 | 610 | 850 | >3½, >3½ |
| 5 | 0.65 | 0.45 | 7 | 175 | 6 | 65 | 115 | 570 | 3, >3½ |
| 6 | 0.65 | 0.35 | 7 | 166 | 15 | 78 | 625 | 600 | >3½, >3½ |
| 7 | 0.65 | 0.35 | 7 | 166 | 52 | 74 | 700 | 1,010 | >3½, >3½ |
| 8 | 0.65 | 0.35 | 7 | 167 | 21 | 87 | 585 | 605 | 3, >3½ |
| 9 | 0.65 | 0.35 | 7 | 172 | 23 | 75 | 665 | 835 | 3, >3½ |

[1] Per equivalent of acids.  [2] Determined at 235° C.  [3] Determined at 210° C.

The foregoing Table I illustrates a number of the possible combinations of the copolymerizing reactants and some of their properties. In all instances it may be seen that high impact resistance and high peel strength are obtained. It may also be observed that stress-strain evaluation shows that these copolymers exhibit high elongation, with moderate tensile strength, characteristics which apparently are needed, along with strong adhesion for high peel strength adhesive joints.

For comparison a copolyamide resin was prepared in the following manner omitting the monoethanolamine.

Using the procedure as described for Examples 1–9, the copolyamide was prepared from 320 grams of polymerized fat acids (2.2% monomer, 94.6% dimer, 3.2% trimer), 32 grams of sebacic acid and 42.9 grams of ethylene diamine, giving equivalent amounts of amine and acid.

This product has the following properties:

| | |
|---|---|
| Viscosity, poises | 38 |
| Ball and ring melting point, °C. | 174 |
| Peel strength, lbs./lineal inch | 6 |
| Tensile strength, p.s.i. | 2400 |
| Elongation, percent | 380 |
| Amine number | 1.4 |
| Acid number | 8.0 |

As is apparent from the foregoing, the product omitting the alkanolamine, while having good tensile strength and good elongation nevertheless has an extremely low peel strength. In each of the products employing the alkanolamine, the peel strength is unexpectedly high thus providing a composition particularly suitable for metal to metal bonding as in bonding the seams of metallic containers particularly with the combined improvement in impact strength. Metallic containers made in the conventional manner using this copolymer as a cement in the seams are rigid and the seams will not fail under ordinary handling in manufacturing, packing and shipping.

The examples herein have been limited to the components of the polyesteramide-polyamide itself. This is not meant to be limiting as to the scope of the invention, however, as the copolymer composition may also include stabilizers, anti-oxidants, pigments, fillers and the like.

The embodiments of the invention in which an exclusive property or privilege is claimed are defined as follows:

1. A metallic container having seams, said seams being bonded by a polyesteramide-polyamide composition having improved peel strength, said composition comprising the condensation product at temperatures in the range of 150–300° C. of a mixture of (A) a diamine of the formula $$H_2N—R'—NH_2$$

where R' is an aliphatic hydrocarbon radical of from 2 to 20 carbon atoms and (B) is hydroxyamine of the formula $$H_2N—R'''—OH$$

where R''' is a divalent aliphatic hydrocarbon radical having from 2 to 8 carbon atoms with a mixture of (C) a dicarboxylic compound of the formula $$R''OOC—R—COOR''$$

where R is a divalent hydrocarbon radical of from 2 to 20 carbon atoms and R'' is selected from the group consisting of hydrogen and aliphatic hydrocarbon radicals having from 1 to 8 carbon atoms and (D) polymeric fat acids having a dimeric fat acids content of greater than 80% by weight and a trimeric to monomeric fat acids ratio substantially within the area ABCD defined in the drawing, the sum of the molar equivalents of amine and hydroxy groups employed being essentially equal to the molar equivalents of carboxylic groups employed, the molar equivalent ratio of said polymeric fat acids to said dicarboxylic compound being in the range of from 1:0.05 to 1:0.5 and the molar equivalent ratio of said diamine to said hydroxy amine being in the range of from 20.0 to 0.5.

2. A metallic container as defined in claim 1 in which said diamine is 1,2-diaminoethane.

3. A metallic container as defined in claim 1 in which said hydroxyamine is monoethanolamine.

4. A metallic container as defined in claim 1 in which said dicarboxylic compound is adipic acid.

5. A metallic container as defined in claim 1 in which said dicarboxylic compound is sebacic acid.

6. A metallic container as defined in claim 1 in which said polymeric fat acids are polymerized tall oil fatty acids.

7. A polyesteramide - polyamide composition having improved peel strength comprising the condensation product at temperatures in the range of 150–300° C. of a mixture of (A) a diamine of the formula $$H_2N—R'—NH_2$$

where R' is an aliphatic hydrocarbon radical of from 2 to 20 carbon atoms and (B) a hydroxyamine of the formula $$H_2N—R'''—OH$$

where R''' is a divalent aliphatic hydrocarbon radical having from 2 to 8 carbon atoms with a mixture of (C) a dicarboxylic compound of the formula $$R''OOC—R—COOR''$$

where R is a divalent hydrocarbon radical of from 2 to 20 carbon atoms and R'' is selected from the group consisting of hydrogen and aliphatic hydrocarbon radicals having from 1 to 8 carbon atoms and (D) polymeric fat acids having a dimeric fat acids content of greater than 80% by weight and a trimeric to monomeric fat acids ratio substantially within the area ABCD defined in the drawing, the sum of the molar equivalents of amine and hydroxy groups employed being essentially equal to the molar equivalents of carboxylic groups employed, the molar equivalents ratio of said polymeric fat acids to said dicarboxylic compound being in the range of from 1:0.05 to 1:0.5 and the molar equivalent ratio of said diamine to said hydroxy amine being in the range of from 20.0 to 0.5.

8. A composition as defined in claim 7 in which said diamine is 1,2-diaminoethane.

9. A composition as defined in claim 7 in which said hydroxyamine is monoethanolamine.

10. A composition as defined in claim 7 in which said dicarboxylic compound is adipic acid.

11. A composition as defined in claim 7 in which said dicarboxylic compound is sebacic acid.

12. A composition as defined in claim 7 in which said polymeric fat acids are polymerized tall oil fatty acids.

References Cited

UNITED STATES PATENTS

| | | | |
|---|---|---|---|
| 2,450,940 | 10/1948 | Cowan et al. | 260—18 |
| 2,617,813 | 11/1952 | Ralston et al. | 260—404.5 |
| 2,728,737 | 12/1955 | Wittcoff | 260—18 |
| 2,793,220 | 5/1957 | Barrett et al. | 260—18 |
| 2,861,048 | 11/1958 | Wright et al. | 260—22 |
| 2,886,543 | 5/1959 | Peerman et al. | 260—404.5 |
| 2,955,951 | 10/1960 | Aelony | 260—404.5 |
| 3,037,871 | 6/1962 | Floyd et al. | 260—404.5 |
| 3,134,682 | 5/1964 | Vogel et al. | 117—132 |
| 2,839,219 | 6/1958 | Groves et al. | 260—18 |
| 2,653,880 | 9/1953 | Hendricks et al. | 260—18 |
| 2,379,413 | 7/1945 | Bradley | 260—404.5 |

OTHER REFERENCES

Anderson et al.: Journal American Chemical Society, vol. 70, pp. 760–763, February 1948.

Development Bulletin Number 69, Emery 3079–S Polymerized Fatty Acid, Emery Industries, 1956, 4 pages.

DONALD E. CZAJA, *Primary Examiner.*

C. W. IVY, *Assistant Examiner.*